United States Patent [19]

Carone

[11] Patent Number: 5,765,451
[45] Date of Patent: Jun. 16, 1998

[54] SLIPPER BEARING ASSEMBLY FOR RADIAL INTERNAL COMBUSTION ENGINE

[76] Inventor: Robert P. Carone, 444 W. Ocean Blvd., Long Beach, Calif. 90802

[21] Appl. No.: 385,834

[22] Filed: Feb. 9, 1995

[51] Int. Cl.⁶ .................. F16C 11/02; F16C 9/04
[52] U.S. Cl. ................ 74/597; 74/580; 123/197.3
[58] Field of Search ................. 74/597, 596, 595, 74/598, 580, 579 E; 123/197.3, 197.4

[56] References Cited

U.S. PATENT DOCUMENTS

| | | | |
|---|---|---|---|
| 736,458 | 8/1903 | Sturtevant | 74/580 |
| 1,186,341 | 6/1916 | Senderling | 74/580 |
| 2,044,581 | 6/1936 | Lee | 74/595 X |
| 2,088,863 | 8/1937 | McClelland | 74/580 |
| 2,671,436 | 3/1954 | Pitt et al. | 123/55 |
| 4,886,023 | 12/1989 | Werner et al. | 123/197.4 |
| 5,150,670 | 9/1992 | Sadler . | |

*Primary Examiner*—Charles A. Marmor
*Assistant Examiner*—MarryAnn Battista
*Attorney, Agent, or Firm*—Harlan P. Huebner

[57] ABSTRACT

A slipper bearing assembly as a part of a piston rod and piston assembly for an internal combustion radial engine wherein there are a plurality of slave piston rods interfitted within a master connecting rod and means to retain the slipper bearing assembly to a common crank pin. The master connecting rod having slots to allow radial angular movement of the slave rods during operation of the engine.

6 Claims, 4 Drawing Sheets

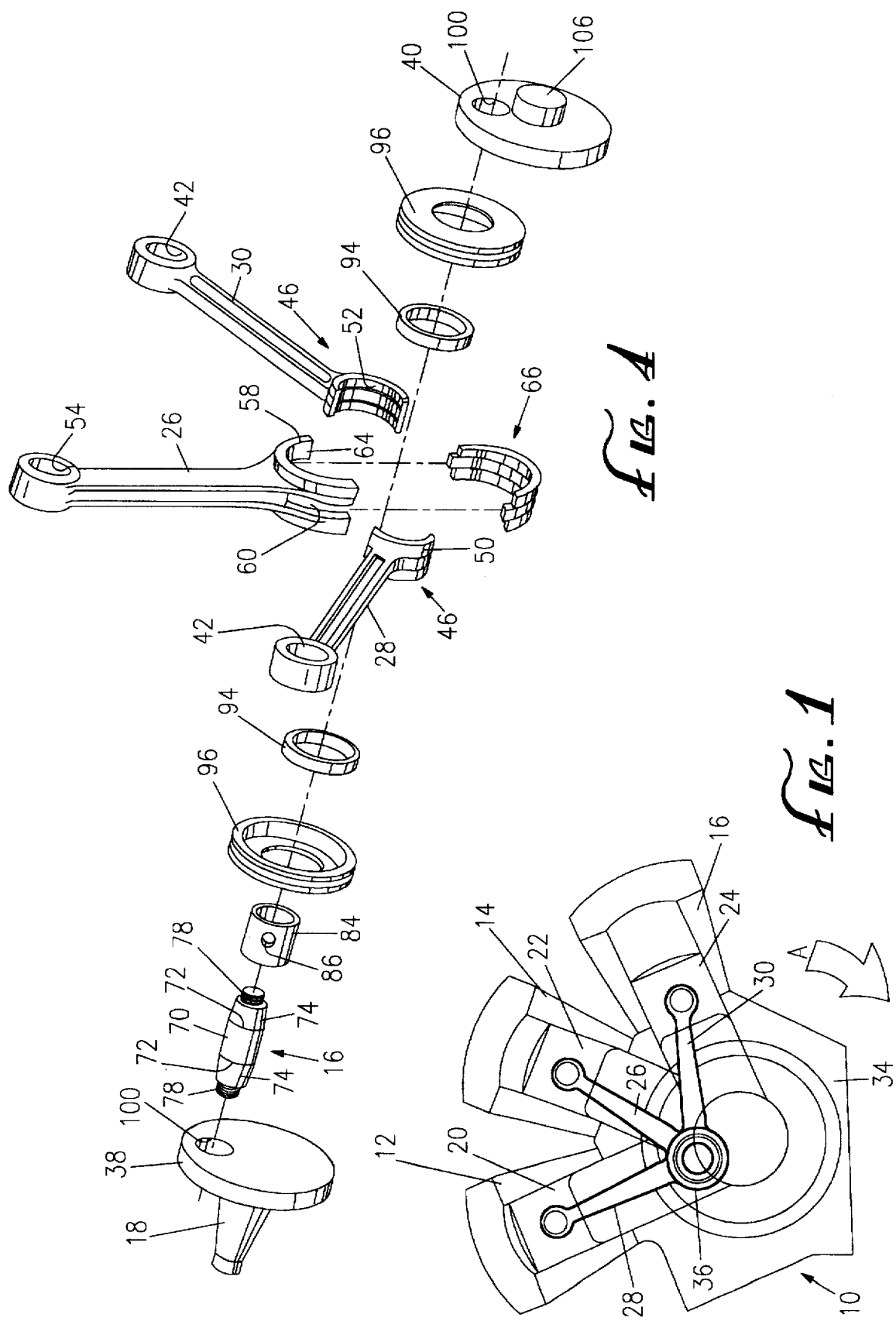

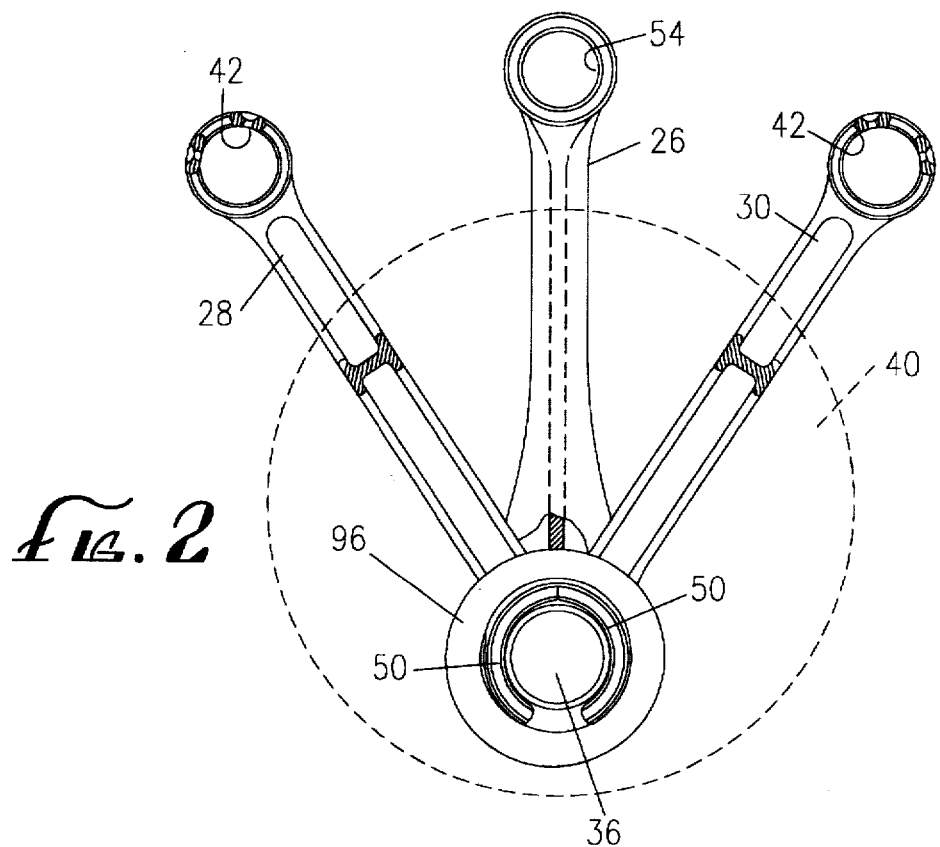
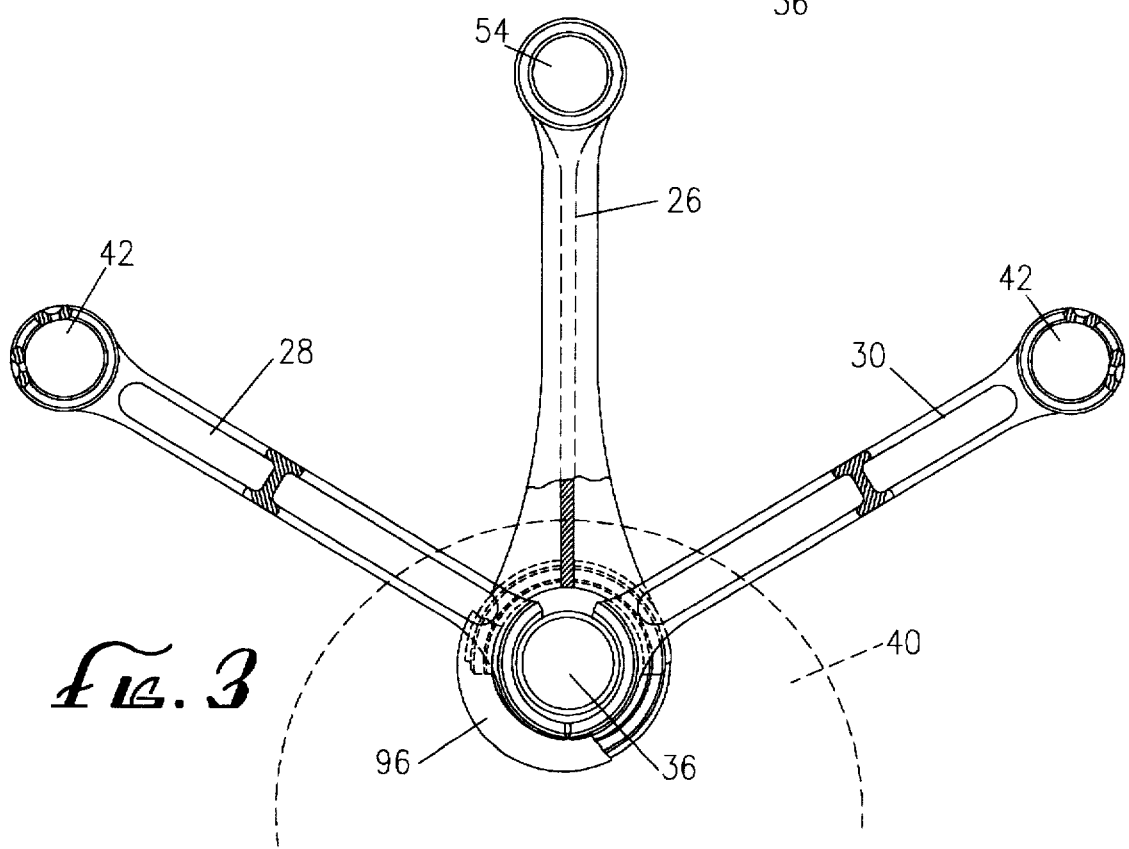

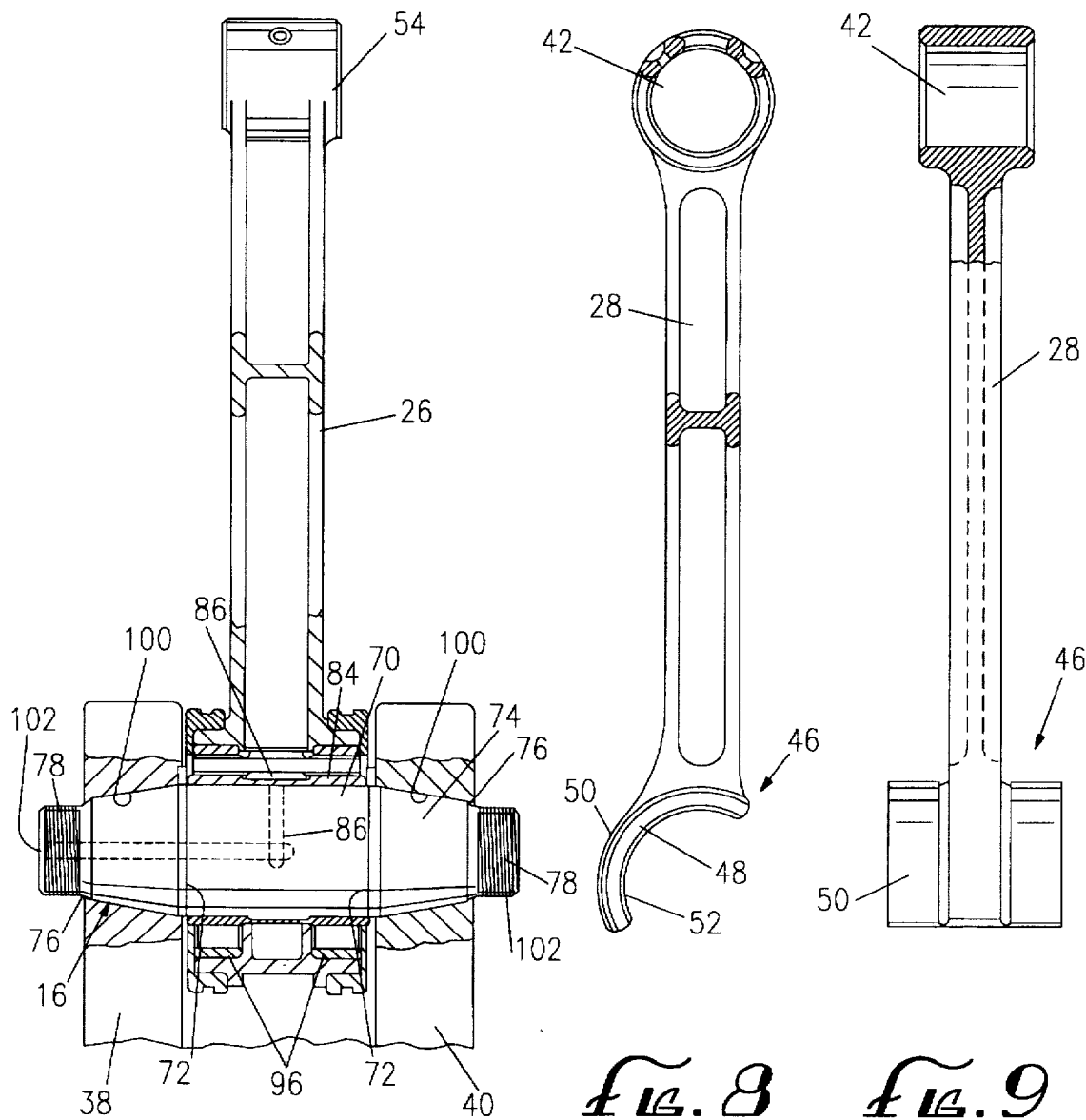

5,765,451

SLIPPER BEARING ASSEMBLY FOR RADIAL INTERNAL COMBUSTION ENGINE

BACKGROUND OF THE INVENTION

1. Field of the Invention

The present invention relates to internal combustion engines, and more specifically to a slipper bearing assembly for use with connecting rods in radial internal combustion engines.

2. Description of the Prior Art

The coupling of multiple connecting rods to a single eccentric crank pin or journal coupled to a crankshaft is a common problem in radial engines with cylinders disposed in the same plane. To overcome these problems various approaches have been devised, however, these solutions experience inherent difficulties when used in small lightweight engine applications such as motorcycles engines.

The link rod assembly, well known in the art, is an illustration of a common solution. The link rod assembly is comprised of a master connecting rod fitted around the entire circumference of an eccentric crank journal which in turn is coupled to a crankshaft. A plurality of connecting rods positioned radially about the eccentric journal are secured to the outer surface of the master connecting rod by link joints. The master connecting rod provides an interface between the plurality of connecting rods and the eccentric journal. However, since the center axis of each connecting rod intersects the center axis of the eccentric journal only when its respective piston is at top dead center, different acceleration rates occur. These differential acceleration rates produce high engine vibration and is undesirable in many small lightweight engine applications.

The slipper bearing assembly, also well known in the art, has been used to reduce these vibrations encountered in link rod assembly configurations. U.S. Pat. Nos. 5,150,670, 2,671,436, and 2,044,581 are illustrative of the prior art relating to slipper bearing assemblies. In these disclosures, a pair of rings are used to retain a plurality of connector rod slipper bearings to a common crankshaft journal. This configuration requires that the cylinders be sufficiently spaced in the radial dimension to allow full displacement of the slipper bearings relative to the common eccentric journal as the connector rod undergoes a complete reciprocating cycle. This configuration limits the number of cylinders available. Moreover, in applications with tight physical size constraints, this configuration may not be feasible because of the radial spacing requirements of the cylinders.

SUMMARY OF THE INVENTION

The purpose of the present invention is to provide a radial arrangement of cylinders whereby a floating master rod is utilized to couple a plurality of slave connecting rods to a common crank pin or journal sandwiched between two flywheels and positioned eccentrically thereon. This invention is particularly well suited for motorcycle applications where the cylinders must be spaced closely together in the radial dimension.

A floating masted rod provides a means for retaining a plurality of slipper bearings to the common crank journal. The slipper bearings are formed integrally with connecting rods which couple the reciprocating motion of the pistons to the common crank journal through circumferentially spaced slots in the master rod and thereby cause the flywheels to rotate. These master rod slots, through which the connecting rods extend outward, are of sufficient arcuate length to permit radial displacement of the slipper bearings during normal operation.

An attractive feature of this invention is that the radial spacing between the cylinders can be reduced because the master rod is floating with respect to the eccentric crank journal. Another advantage is that the induced vibrations are drastically reduced over the link rod assembly coupling arrangement.

These and other objects and advantages will become apparent from the following part of the specification wherein details have been described for the competence of disclosure, without intending to limit the scope of the invention which is set forth in the appended claims.

BRIEF DESCRIPTION OF THE DRAWINGS

These advantages may be more clearly understood from the following detailed description and by reference to the drawings in which:

FIG. 1 is a front elevational view in cross-section of a radial internal combustion engine using the present invention;

FIG. 2 a front elevational view partly in a cross-section through the crank journal depicting the connecting rods and the angular displacement of the slipper bearings relative to the crank journal with the master connecting rod piston at bottom dead center;

FIG. 3 is a view similar to FIG. 2 with the master connecting rod piston at top dead center;

FIG. 4 is an exploded view of the slipper bearing assembly;

FIG. 5 is a cross-sectional side elevational view through the assembled slave connecting rod showing it affixed to the crank journal;

FIG. 8 is front elevational view of a slave connecting rod; and

FIG. 9 is a side elevational view of a slave connecting rod.

DETAILED DESCRIPTION OF THE PREFERRED EMBODIMENT

Figures 6, 7:
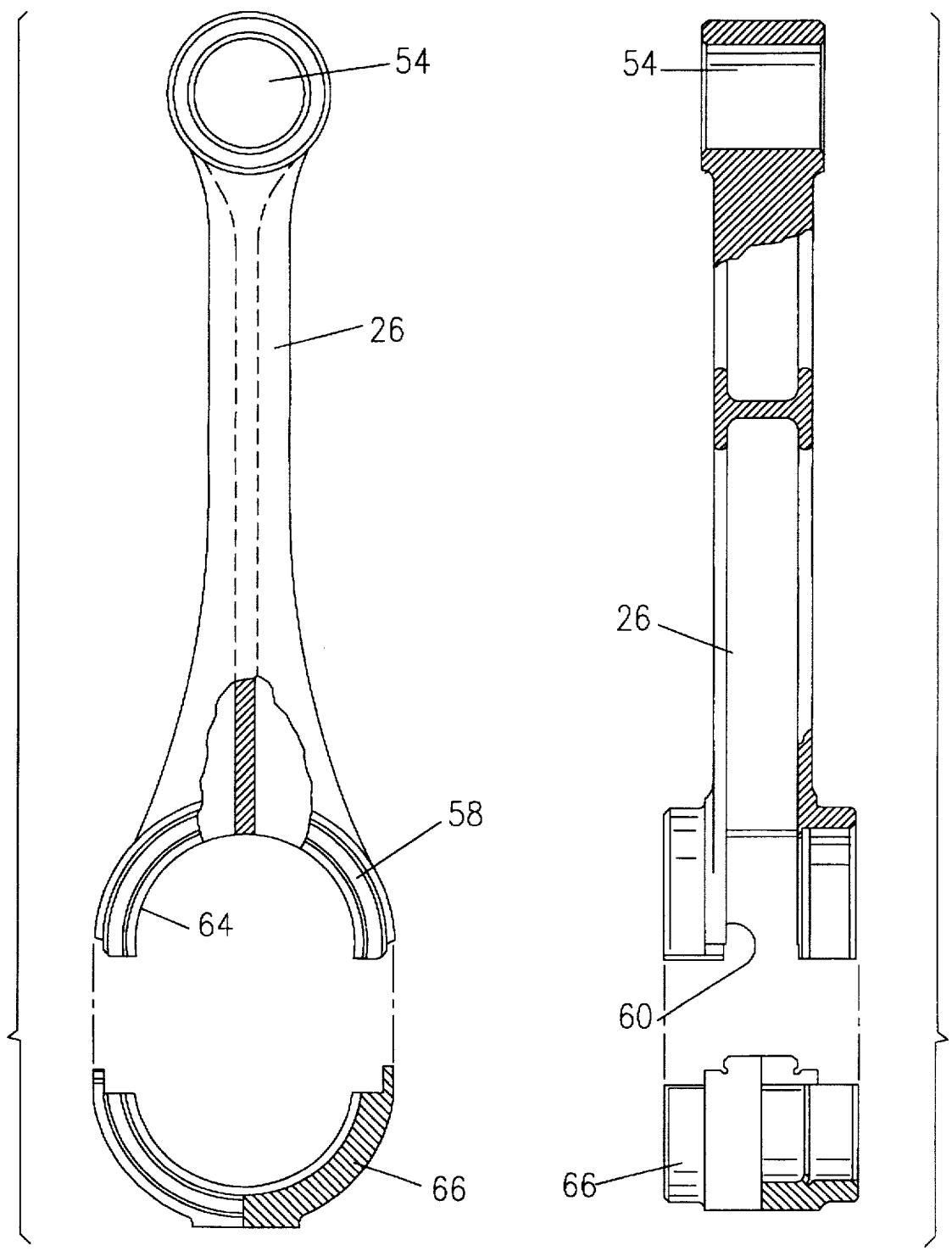
FIG. 6 is a front elevational view of the master connecting rod.
FIG. 7 is a side view of the master connecting rod of FIG. 6.

FIG. 1 depicts the preferred embodiment of the invention. The engine cylinder block designated 10 is formed with at least three cylinders 12, 14, and 16 spaced 45° degrees apart and arranged vertically radially with respect to the center axis of a crankshaft 18 in the same vertical plane. Disposed within each cylinder 12, 14, and 16 are pistons 20, 22, and 24 respectively. Each of the aforementioned pistons are constructed for reciprocal movement within its respective cylinder. A master connecting rod 26 and slave piston connecting rods 28 and 30 are respectively fastened to each piston with a conventional piston pin and lock ring combination (not shown) or by any other means known in the art. The master connecting rod 26 and the slave connecting rods 28 and 30 extend inwardly through a respective opening in the crankcase 34 and are secured to a common crank journal pin 36 by the master connecting rod 26. The connecting rods 28 and 30 couple the reciprocating motion of the pistons 20 and 24 to the common crank pin journal 17 positioned along an eccentric axis about flywheels 38 and 40 (see FIGS. 1 and 5).

Referring particularly to FIGS. 8 and 9, each slave connecting rod 28 and 30 is configured in a slipper bearing arrangement comprising the rods 28 and 30 having opposed edges 29 with an enlarged opening 42 for attachment to the pistons at its upper end. At the opposite end 41 a slipper bearing designated 46 is found. The enlarged circular opening 42 is configured to receive a piston pin therethrough for connection to piston 20 or 24. The slipper bearing 46 is an arcuate flange 48 offset from the center axis of the rod 28. The slipper bearing 46 extends transversely with respect to the rod 28 and defines an outer bearing surface 50 and inner bearing surface 52 on both its upper portion and bottom portion. The radius of curvature of the inner bearing surface 52 of the slipper bearing 46 corresponds to the radius of curvature of the crank pin 36 for engagement therewith.

The master connecting rod 26 having opposed sides 53 is terminated at an upper end into an enlarged circular opening 54 to receive a piston pin therethrough for connection with piston 22. See FIGS. 5, 6 and 7. The lower end 55 of the rod 26 terminates in a pair of arcuate generally semi circular flanges 58 formed on each side of the rod 26 each with a pair of circumferentially spaced slots 60. The arcuate flanges 58 each includes an inner bearing surface 64 whose radius of curvature corresponds to the outer bearing surface 50 of the slipper bearing 46 of either of its slave connecting rods 28 and 30.

The slipper bearings 46 are retained on the crank journal pin 36 by the arcuate flange 58 of the master connecting rod 26 in conjunction with a master rod cap 66. See FIGS. 4, 5 and 6. The slave connecting rods 28 and 30 extend outward towards their respective cylinders through the circumferentially spaced slots 60 formed within the arcuate flanges 58 of the master connecting rod 26. These slots 60 are of sufficient arcuate length to permit the angular swinging of the slave connection rods 28 and 30 resulting from angular displacement of the slipper bearings with respect to the common crank journal pin 36 during normal operation. (see FIGS. 2 and 3)

The crank pin designated 17 includes a central annular bearing surface 70 of a common diameter throughout. Extending outwardly from opposite ends 72 are annular tapered shank portions 74 and at ends 76 there are threaded end shanks 78.

There is provided a slave connector rod bearing 84 pinned onto the annular bearing surface 70 of each crank journal pin 36 to provide a bearing surface between the slipper bearings 46 and the bearing surface 70. Lubrication is provided between the crank journal 36 and the slipper bearings 46 by oil flow passage 86. See FIGS. 4 and 5. The oil flow passage 86 terminates into an outlet port 88 to allow the slipper bearings 46 to freely slide on the crank journal 36.

The arcuate flange 58 of the master connecting rod 26 is floating with respect to the crank journal pin 36. A pair of master connecting rod bearings 94 are inserted between the outer bearing surface 50 of the slipper bearing 46 and the inner bearing surface 64 of the arcuate flange 58 of the master connecting rod 26 to provide a bearing surface for the relative motion between said arcuate flange 58 and slipper bearings 46. The master connecting rod bearings 94 are lubricated by an oil spray from oil port 86. The entire slipper bearing assembly is held together by retaining rings 96 which are press fit over the assembled arcuate flanges 58 and 66 of the master connector rod 26.

The crank journal pin 36, along with the slipper bearing assembly mounted thereon, is sandwiched between two parallel vertical flywheels 38 and 40. The shank portions 74 are inserted into mating tapered bores 100 formed within flywheels 38 and 40 and secured thereto with nuts 102 threaded on the end shanks 78. Thrust washers 104 provide a bearing surface for the relative motion between the flywheels 38 and 40 and the retaining rings 96.

Pressure exerted by the reciprocating motion of pistons 20, 22, and 24 against the crank journal pin 36 causes the flywheels 38 and 40 to rotate. This rotary motion is transmitted by flywheel 38 through the crankshaft 18 and the power train (not shown) to the motorcycle wheels.

The floating master rod 26 configuration allows cylinders 20, 22, and 24 to be disposed in the same vertical plane with a radial angular spacing of 45° with respect to the center axis of the crankshaft 18. The advantages of this invention can be better understood by referring to FIGS. 2 and 3. The crank journal pin 36 follows a circular translatory path in direction of arrow A in FIG. 1 so that the axis of the crank journal pin 36 has a locus of a circle with its center corresponding to the center axis 106 of the crankshaft 18. Referring to FIGS. 1, 2 and 3, when piston 22 is at top dead center, the slipper bearings 46 experience maximum angular displacement with respect to each other. As the crank journal pin 36 continues in its translatory path, the angular displacement between the slipper bearings 46 is decreased until piston 22 is at bottom dead center where the angular displacement is at its minimum. At this point, the angular displacement begins to increase as the crank journal pin 36 continues on its translatory path until piston 22 is once again at top dead center where the angular displacement is at its maximum. Referring to FIG. 2, it is readily apparent that the angular displacement of the slipper bearings 46 preclude the addition of another slipper bearing without increasing the angular spacing between cylinders 20 and 24 to 180°.

The invention and its attendant advantages will be understood from the foregoing description and it will be apparent that various changes may be made in the form, construction and arrangements of the parts without departing from the spirit and scope thereof or sacrificing its material advantages, the arrangements herein before described being merely by way of example. I do not wish to be restricted to the specific forms shown or uses mentioned, except as defined in the accompanying claims, wherein various portions have been separated for clarity of reading and not for emphasis.

I claim:

1. A slipper bearing assembly for connecting rods, each having a piston and each of said pistons being adapted to seat within a cylinder of a radial internal combustion engine, said assembly mounted between a pair of spaced apart flywheels, one of which is connected to an engine crankshaft having a longitudinal axis, said assembly comprising:

an annular crank pin extending between said flywheels, said flywheels having tapered bores which are off set from the axis of said crankshaft, said annular crank pin including an annular central section of a constant diameter and projecting from said central section are ends that include tapering sections and threaded ends extending outwardly of said tapering sections and said tapered bores of said flywheels engaging said tapering sections of said annular crank pin;

a master connecting rod including an elongated column with sides and having an upper and lower end, said upper end receiving one of said pistons for seating in one of said cylinders and a pair of arcuate flanges formed on said lower end of said column and having a bottom bearing surface with a radius of curvature, each of said arcuate flanges including radially spaced slots of a set length;

a plurality of slave connecting rods each including an elongated column with sides and having an upper and a lower end, said upper ends receiving said cylinders, and an arcuate flange projecting from one of said sides of each of said columns of said slave connecting rods having an arcuate top bearing surface corresponding to the radius of curvature of said bottom bearing surface of said master connecting rod and a bottom arcuate bearing surface corresponding to the radius of curvature of said annular crank pin and received by said annular central section thereof;

said slave connecting rods being coupled to said annular crank pin with said bottom arcuate bearing surface being in contact with said annular central section and with said column of each projecting upward within one of said radially spaced slots, and said master connecting rod connected to said slave connecting rods with said bottom bearing surface of said arcuate flanges of said master connecting rod engaging one of said top bearing surfaces of said slave connecting rods, wherein with off set rotational movement of said annular crank pin said slave connecting rods are allowed angular rotational movement within said radially spaced slots during rotational movement of said crankshaft; and retaining means to yieldably secure said arcuate flanges of said master connecting rod to each other and around said annular crank pin.

2. A slipper bearing assembly as defined in claim 1 wherein:

said retaining means is a master connecting rod arcuate cap that engages said arcuate flanges of said slave connecting rods.

3. A slipper bearing assembly as defined in claim 1 wherein:

bearings are inserted between said bottom bearing surface of said master connecting rod and said top bearing surfaces of each of said arcuate flanges of said slave connecting rods.

4. A slipper bearing assembly as defined in claim 1 wherein:

bearing are inserted between said bottom arcuate bearing surfaces of said slave connecting rods and said annular crank pin.

5. A slipper bearing assembly as defined in claim 1 wherein:

said cylinders of said radial internal combustion engine are on a common vertical plane and angularly spaced 45° with respect to the said axis of said crankshaft, and said master connecting rod piston is mounted in a center cylinder with said slave connecting rod pistons each being mounted in the cylinder on either side of said center cylinder.

6. A slipper bearing assembly as defined in claim 5 wherein:

rotation of said crankshaft and in turn said annular crank pin will move said slave connecting rods toward and away from said master connecting rod causing said slave connecting rods to move back and forth within said radially spaced slots and said radially spaced slots are each of a radial length to accommodate movement of said slave connecting rods during stoke movement.

* * * * *